(12) United States Patent
Zhao et al.

(10) Patent No.: US 11,321,915 B2
(45) Date of Patent: May 3, 2022

(54) CONVERSION OF ROCK CLASSIFICATION MAPS FOR MODELING

(71) Applicant: Chevron U.S.A. Inc., San Ramon, CA (US)

(72) Inventors: Yushi Zhao, Missouri City, CA (US); Jianchang Liu, Katy, TX (US); Barry Jay Katz, Spring, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 3 days.

(21) Appl. No.: 16/946,265

(22) Filed: Jun. 12, 2020

(65) Prior Publication Data
US 2021/0390773 A1  Dec. 16, 2021

(51) Int. Cl.
*G06T 17/05* (2011.01)

(52) U.S. Cl.
CPC ................... *G06T 17/05* (2013.01)

(58) Field of Classification Search
None
See application file for complete search history.

(56) References Cited

U.S. PATENT DOCUMENTS

| | | | | |
|---|---|---|---|---|
| 5,689,425 | A * | 11/1997 | Sainio | B41F 33/0036 101/181 |
| 2006/0052938 | A1* | 3/2006 | Thorne | G01V 1/30 702/11 |
| 2007/0219724 | A1* | 9/2007 | Li | G01V 1/306 702/12 |
| 2008/0285885 | A1* | 11/2008 | Rahmes | G06T 5/005 382/284 |
| 2016/0047939 | A1* | 2/2016 | Mumelter | G01V 11/00 702/2 |
| 2017/0306750 | A1* | 10/2017 | Carpenter | G01V 11/002 |
| 2018/0068037 | A1* | 3/2018 | Williams | G06Q 30/02 |
| 2021/0041588 | A1* | 2/2021 | Chen | G01V 1/301 |

OTHER PUBLICATIONS

Wikipedia, "Esh Grid", captured Apr. 25, 2020, "https://en.wikipedia.org/wiki/Esri_grid", pp. 1-3 (Year: 2020).*
Yu, "Arcinfo ASCII Grid Format", last modified Jul. 9, 2006, captured 2015, Codehaus, "http://docs.codehaus.org/display/GEOTOOLS/ArcInfo+ASCII+Grid+format" pp. 1-2 (Year: 2015).*
Hayes et al., "Mapping Lithologic Criteria for Mineral Deposit Potential Using A Subsurface Lithologic Database Interactive with ARC/INFO", 1992, Mineral Resources of the Illinois Basin in the Context of Basin Evolution, vol. 92, pp. 22-25 (Year: 1992).*
PCT Search Report and Written Opinion, PCT/US2021/035505, dated Sep. 17, 2021 (9 pages).

* cited by examiner

*Primary Examiner* — Xiao M Wu
*Assistant Examiner* — Jonathan M Cofino
(74) *Attorney, Agent, or Firm* — Esplin & Associates, PC

(57) ABSTRACT

Non-interpolatable classification of rocks in a region as defined by rock classification maps may be digitized to generate gridded index map. For rock classification maps stored as raster images, image treatment may be applied to generate the gridded index map. The gridded index map may be associated with lithology values using a rock-lithology library, and the lithology values may be used to generate a lithologic representation of the region. Such conversion of rock classification maps for modeling the region may improve input lithologic data accuracy and consistency, while enhancing the efficiency of lithologic modeling (e.g., for basin modeling).

20 Claims, 8 Drawing Sheets

CONVERSION OF ROCK CLASSIFICATION MAPS FOR MODELING

FIELD

The present disclosure relates generally to the field of converting rock classification maps for modeling.

BACKGROUND

Rock classification maps may include non-interpolatable classification of rocks in a region. Converting the rock classification maps for use in modeling may be difficult and/or time consuming. This problem applies to mappable discrete data sets, such as facies types, kerogen types, mineralogic identification, and point counting of a petrographic thin section.

SUMMARY

This disclosure relates to converting rock classification maps for modeling. Rock classification map information and/or other information may be obtained. The rock classification map information defining a rock classification map. The rock classification map may include non-interpolatable classification of rocks in a region. A gridded index map may be generated from the rock classification map. The gridded index map may include digitization of the non-interpolatable classification of the rocks in the region into digitized values. The gridded index map may be associated with lithology values based on matching between the digitized values of the gridded index map and values of a rock-lithology library, and/or other information. A lithologic representation of the region may be generated based on the lithology values of the gridded index map and/or other information.

A system that converts rock classification maps for modeling may include one or more electronic storage, one or more processors and/or other components. The electronic storage may store rock classification map information, information relating to rock classification map, information relating to non-interpolatable classification of rocks in a region, information relating to gridded index map, information relating to digitized values, information relating to lithology values, information relating to rock-lithology library, information relating to lithologic representation of a region, and/or other information.

The processor(s) may be configured by machine-readable instructions. Executing the machine-readable instructions may cause the processor(s) to facilitate converting rock classification maps for modeling. The machine-readable instructions may include one or more computer program components. The computer program components may include one or more of a map component, a gridded index map component, a library component, a representation component, and/or other computer program components.

The map component may be configured to obtain rock classification map information and/or other information. The rock classification map information may define a rock classification map. The rock classification map may include non-interpolatable classification of rocks in a region. In some implementations, the region may include a basin. In some implementations, the rock classification map may include a sedimentary facies map, a source-kerogen map, a kinetics map, a thin-section mineralogy map, and/or a point counting map.

In some implementations, the non-interpolatable classification of the rocks in the region may be provided by pixel values of the rock classification map. In some implementations, the rock classification map may be captured and stored as a raster image. In some implementations, the rock classification map may be stored as a polygon.

The gridded index map component may be configured to generate a gridded index map from the rock classification map. The gridded index map may include digitization of the non-interpolatable classification of the rocks in the region into digitized values. In some implementations, the rock classification map may be captured and stored as a raster image, and the gridded index map may be generated from the rock classification map based on image treatment of the raster image. In some implementations, the rock classification map may be stored as a polygon, and the gridded index map is generated from the rock classification map based on gridding of the polygon. In some implementations, the gridded index map may be generated from the rock classification map further based on image treatment of the gridded polygon.

The image treatment of the raster image may include geo-referencing, indexing, border treatment, void treatment, and reading and writing in standard ASCII gridding format. In some implementations, the geo-referencing may include fitting the raster image or the gridded index map onto a three-dimensional subsurface representation of the region. In some implementations, the non-interpolatable classification of the rocks in the region may be provided by pixel values of the rock classification map, and the indexing may include conversion of the pixel values of the rock classification map into the digitized values. In some implementations, the border treatment may include replacement of one or more borders in the rock classification map with one or more of the digitized values. In some implementations, the void treatment may include filling of one or more voids in the rock classification map using one or more of the digitized values.

The library component may be configured to associate the gridded index map with lithology values. The gridded index map may be associated with the lithology values based on matching between the digitized values of the gridded index map and values of a rock-lithology library, and/or other information.

The representation component may be configured to generate a lithologic representation of the region. The lithologic representation of the region may be generated based on the lithology values of the gridded index map, and/or other information. In some implementations, the region may include a basin, and the lithologic representation of the basin may be used for basin modeling.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to converting rock classification maps for modeling. Non-interpolatable classification of rocks in a region as defined by rock classification maps may be digitized to generate gridded index map. For rock classification maps stored as raster images, image treatment may be applied to generate the gridded index map. The gridded index map may be associated with lithology values using a rock-lithology library, and the lithology values may be used to generate a lithologic representation of the region. Such conversion of rock classification maps for modeling the region may improve input lithologic data accuracy and consistency, while enhancing the efficiency of lithologic modeling (e.g., for basin modeling).

Figure 1:
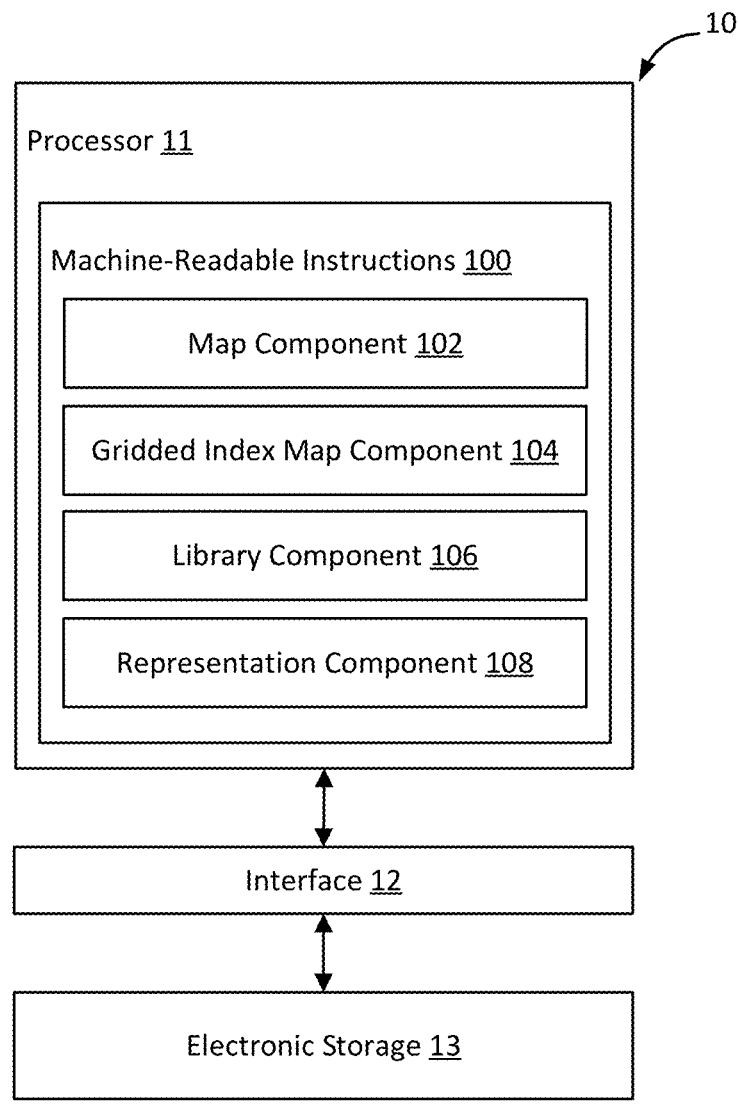
FIG. 1 illustrates an example system that convert rock classification maps for modeling.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Rock classification map information and/or other information may be obtained by the processor 11. The rock classification map information defining a rock classification map. The rock classification map may include non-interpolatable classification of rocks in a region. A gridded index map may be generated by the processor 11 from the rock classification map. The gridded index map may include digitization of the non-interpolatable classification of the rocks in the region into digitized values. The gridded index map may be associated with lithology values by the processor 11 based on matching between the digitized values of the gridded index map and values of a rock-lithology library, and/or other information. A lithologic representation of the region may be generated by the processor 11 based on the lithology values of the gridded index map and/or other information.

A detailed lithologic representation (e.g., 3D computer model) of a region may be generated from maps of different lithologic type that depicts spatial variations in lithology within the region. Such maps may be used for three-dimensional modeling of region. For example, such maps may be used for three-dimensional modeling of a basin as part of a petroleum exploration project. However, two issues exist: (1) lithologic model input data is non-interpolatable (discrete/discontinuous), and (2) there is lack of consistency in conversion of input data to lithology values for modeling (e.g., lack of consistency in litho-facies assignment and documentation in basin modeling). There are difficulties in gridding and digitizing non-interpolatable data for modeling. For example, lithologic information and spatial variations may need to be manually edited, which may be time-consuming and prone to error. Manual simplification of lithologic details may compromise model accuracy. Lack of consistency in conversion of input data to lithology values for modeling may make modeling results from different input data/different modeling incomparable.

Present disclosure provides an automated lithologic model workflow that resolves these issues. The automated lithologic model workflow improve lithological modeling in two aspects. First, the workflow efficiently transforms rock classification maps (e.g., sedimentary facies maps, source-kerogen maps, kinetics map, thin-section mineralogy maps, point counting maps) into gridded index maps. Second, the workflow correlates gridded index maps with lithology types using a rock-lithology library. Rock classification maps may be stored as a raster image or a polygon.

The first aspect of the workflow may create a series of digital (gridded) maps based on format of the rock classification maps. Rock classification maps stored as raster images may be processed using automated image treatment to generate gridded index maps. Rock classification maps stored as polygons may be directly gridded to generate gridded index maps. The gridded index map may be utilized as input for modeling (e.g., basin modeling). The first aspect of the workflow may enhance modeling efficiency. The second aspect of the workflow may associate lithology values with the gridded index map (e.g., gridded sedimentary facies map) using a common or pre-populated rock-lithology library (e.g., sedimentary-facies lithology library). The second aspect of the workflow may enhance modeling consistency.

While the workflow of the disclosure is described herein with respect to sedimentary facies maps (sedimentary facies-interpretation maps), the same/similar workflow may be used to process other discrete/non-interpolatable datasets, such as, but not limited to, datasets identifying facies and/or providing 2D porosity counts, minerals, cement counts, kerogen type, kinetics, mineralogic identification, point counting of petrographic thin section, and/or other information. The workflow may provide improved digitization techniques that increase efficiency in generating a detailed lithologic representation to reduce modeling uncertainty and an automatic petrographer tool for rapid thin section point counting for reservoir quality modeling applications. Other uses of the workflow are contemplated.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store rock classification map information, information relating to rock classification map, information relating to non-interpolatable classification of rocks in a region, information relating to gridded index map, information relating to digitized values, information relating to lithology values, information relating to rock-lithology library, information relating to lithologic representation of a region, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate converting rock classification maps for modeling. The machine-readable instructions 100 may include one or more computer program components. The machine-readable instructions 100 may include one or more of a map component 102, a gridded index map component 104, a library component 106, a representation component 108, and/or other computer program components.

The map component 102 may be configured to obtain rock classification map information and/or other information. Obtaining rock classification map information may include one or more of accessing, acquiring, analyzing, creating, determining, examining, generating, identifying, loading, locating, opening, receiving, retrieving, reviewing, selecting, storing, utilizing, and/or otherwise obtaining the rock classification map information. The map component 102 may obtain rock classification map information from one or more locations. For example, the map component 102 may obtain rock classification map information from a storage location, such as the electronic storage 13, electronic storage of a device accessible via a network, and/or other locations. The map component 102 may obtain rock classification map information from one or more hardware components (e.g., a computing device, a component of a computing device) and/or one or more software components (e.g., software running on a computing device, model running on a computing device). Rock classification map information may be stored within a single file or multiple files.

The rock classification map information may define one or more rock classification maps. The rock classification map information may define a rock classification map by including information that describes, delineates, identifies, is associated with, quantifies, reflects, sets forth, and/or otherwise defines one or more of content, quality, attribute, feature, and/or other aspects of the rock classification map. For example, the rock classification map information may define a rock classification map by including information that makes up the content of the rock classification map and/or information that is used to identify/determine the content of the rock classification map. The rock classification map may be stored as a raster image, a polygon, and/or in other forms. Other types of rock classification map information are contemplated.

A rock classification map may refer to a diagrammatic representation of a region showing physical features and/or characteristics of rocks in the region. A region may refer to a geographic location, such as a geographic area or a geographic volume. For example, a region may include a basin. A rock classification may show physical features and/or characteristics of rocks in the region by categorizing the physical features and/or characteristics of rocks in the region into one or more classifications. That is, a rock classification may include classification of rocks in the region. For example, a rock classification map may include a sedimentary facies map, a source-kerogen map, a kinetics map, a thin-section mineralogy map, a point counting map, and/or other rock classification map. Other types of rock classification maps are contemplated.

Rocks at different locations in the region may be classified into one or more categories based on their physical features and/or characteristics. Classification of the rock in the region may be provided by one or more visual features of a rock classification map. For example, a rock classification map may include pixels, with pixels representation classification of rocks at different locations in the region. Classification of rocks in the region may be provided by pixel values of the rock classification map. Different pixels values (e.g., colors, intensities) of the pixels within the rock classification may correspond to different classifications of rocks in the regions.

Different rock classification maps for a region may provide diagrammatic representations of different spatial and/or temporal portions of the region. Individual rock classification maps for a region may provide a layer of diagrammatic representations for different spatial and/or temporal portions of the region. For example, multiple rock classification maps for a region may be obtained, with individual rock classification maps showing physical features and/or characteristics of rocks at different verticals depths within the region. As another example, individual rock classification maps may show physical features and/or characteristics of rocks at different deposition time periods within the region.

A rock classification map may include non-interpolatable classification of rocks in a region. That is, classification of rocks provided by a rock classification map may be non-interpolatable. A rock classification may not provide classification of rock in a particular location within the region, and the classification of rock in the particular location may not be estimated based on classification rock in surrounding locations. For example, a left section of a rock classification map may provide classification of rocks in a left portion of the region using a pixel value (e.g., 1), and a right section of the rock classification map may provide classification or rocks in a right portion of the region using a pixel value (e.g., 5). The middle section of the rock classification map may not provide classification of rocks in a middle portion of the region. Interpolating pixels values (e.g., 1, 5) of the left and right sections of the rock classification map may result in a pixel value (e.g., 3) for the middle section that incorrectly classifies the rocks in the middle portion of the region.

Figure 3:
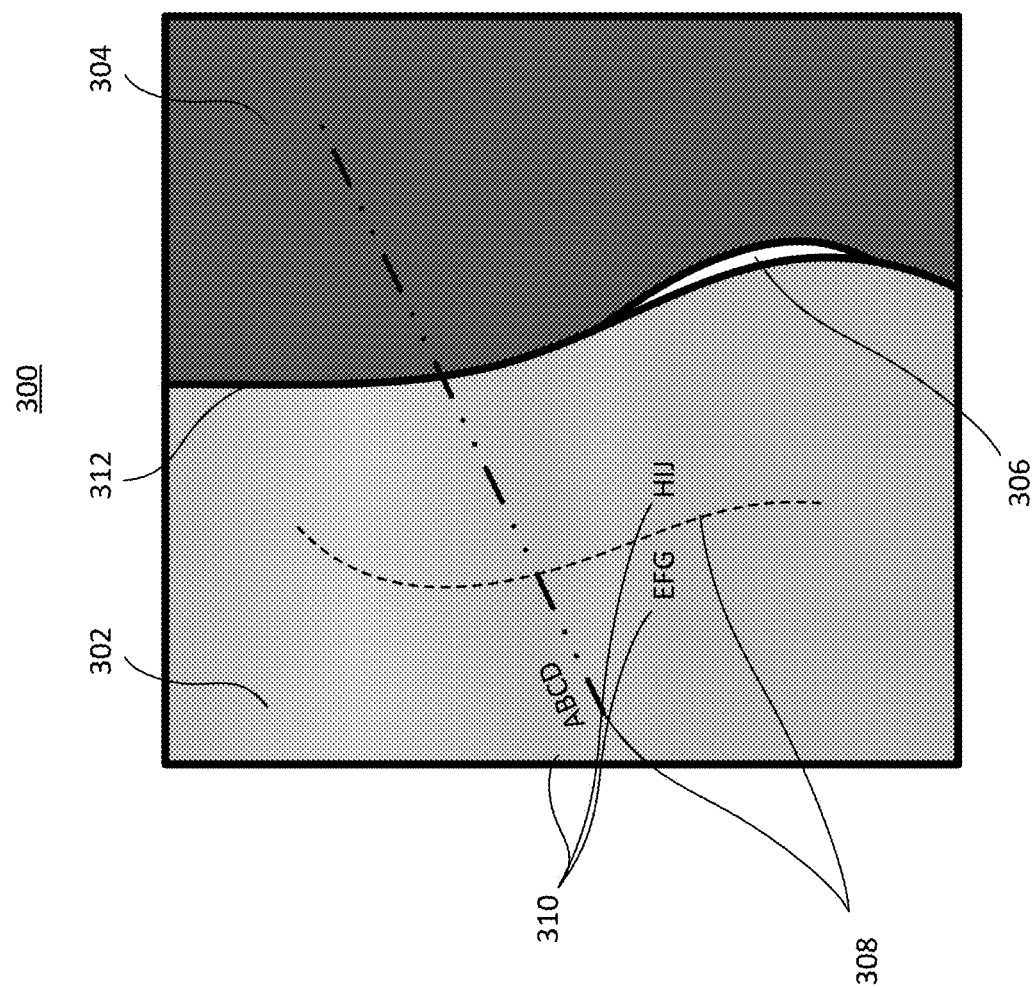
FIG. 3 illustrates an example rock classification map.

FIG. 3 illustrates an example rock classification map 300. The rock classification map 300 may provide classification of rock at different locations within a region using pixel values. For example, the rock classification map 300 may include a sedimentary facies map that provides interpretation of facies at different locations within a region using different colors. For instance, sections 302, 304 of the rock classification map 300 may have pixels of different colors, with the pixel colors corresponding to different facies.

The rock classification map 300 may include and/or lack visual features (elements) that make conversion of the rock classification map 300 for modeling difficult. For example, the section 302 may include color disparity where the color of the section 302 unintentionally becomes lighter (e.g., due to color printing quality), which erroneously suggests that the section 302 include multiple classifications of rock. The rock classification map 300 may include annotations, such as lines 308 and/or words 310 that must be removed and/or flattened to use the rock classification map 300 for modeling. The rock classification map 300 may include borders around the sections 302, 304 that must be removed to use the rock classification map 300 for modeling. The rock classification map 300 may lack information, such as at void 306, for one or more locations within the region. The rock classification map 300 may include other visual features (e.g., legend, notes) that must be addressed to use the rock classification map 300 for modeling.

The gridded index map component 104 may be configured to generate a gridded index map from a rock classification map. The gridded index map component 104 may be configured to generate separate gridded index map for individual rock classification maps. Generation of a gridded index map from a rock classification map may include conversion of the rock classification map into the gridded index map.

A gridded index map may refer to a map that shows locations of small areas in relation to a larger area and that provides information about features of the small areas. A gridded index map may divide the region represented by the rock classification map using grids (e.g., network of evenly spaced horizontal and vertical lines). For example, a gridded index map may divide region represented by the rock classification map into a specified number of row and columns, with individual cells corresponding to different locations within the region. A gridded index map may provide physical features and/or characteristics of rocks at different locations within the region by providing digitized values for the cells within the gridded index map. Digitized values may refer to computer-readable values for the classification of rocks provided by a rock classification map. That is, a gridded index map may be generated by digitizing classification of rocks provided by a rock classification map into digital form (computer-readable form). A gridded index map may include digitization of non-interpolatable classification of the rocks in the region provided by a rock classification map into digitized values (computer-readable values).

For a rock classification map captured and stored as a raster image (e.g., facies image), a gridded index map may be generated from the rock classification map based on image treatment of the raster image. Image treatment may refer to processing of a raster image to produce a gridded index map. For example, image treatment of a raster image may include geo-referencing, indexing, border treatment, void treatment, reading and writing in standard ASCII gridding format, and/or other processing of the raster image.

In some implementations, geo-referencing may include fitting the raster image and/or the gridded index map onto a three-dimensional subsurface representation of the region. A three-dimensional subsurface representation of the region may a computer-generated three-dimensional representation (e.g., 3D model) of the region. Fitting the raster image and/or the gridded index map onto the three-dimensional subsurface representation may include determining corresponding between locations/cells within the raster image/gridded index amp and locations representation by the three-dimensional subsurface representation. For example, geo-referencing may include specifying geo-location of one or more points in the raster image/gridded index map. For instance, geo-referencing may include defining geo-location of the starting and/or the ending point in the raster image/gridded index map so that the raster image/gridded index map may be converted into a three-dimensional subsurface representation of the region. In some implementations, geo-referencing may include one or more image manipulation to fit the raster image and/or the gridded index map onto the three-dimensional subsurface representation of the region. For example, projection of the raster image may be changed and/or distortion may be introduced into the raster image to fir the raster image to a particular shape and/or portion of the three-dimensional subsurface representation of the region.

In some implementations, indexing may include conversion of the classification of rocks provided by the rock classification map into digitized values. For example, the rock classification map may include a sedimentary facies map that provide facies interpretation of rocks in the region using pixel values. Indexing (facies indexing) may include conversion of the pixel values of the rock classification map into digitized values. The pixel values of the rock classification map may be converted into digitized values by flattening and/or sharpening the rock classification map. Indexing may determine and/or suggest number of facies to be set for the rock classification map based on the distribution of pixel values. Distribution of pixel values (e.g., distribution of colors) may be used to determine the dominant facies in the rock classification map, and pixel values not corresponding to the dominant facies may be modified to pixels values of the dominant facies. For example, referring to FIG. 3, the rock classification map 300 may include color gradient that causes color of the rock classification map 300 to become lighter in two portions of the section 302. For instance, the color gradient may exist due to improper scanning of the rock classification map 300. Indexing may determine and/or suggest whether the difference in coloring within the section 302 should be treated as different facies interpretation or as the same facies interpretation (treat color gradient as noise).

In some implementations, border treatment may include replacement of one or more borders in the rock classification map with one or more digitized values. A border may refer to a line that separates portions of the rock classification map. For example, a border may include a line that separates adjacent portions of the rock classification map with differing pixel values (indicating different classifications of the rocks in the adjacent portions). For instance, a border may include the border 312 shown in FIG. 3. As another example, a border may refer to lines that make up annotations in the rock classification map (e.g., the lines 308, the words 310) and/or a border around the rock classification map.

Border treatment may identify borders in the rock classification map and replace the identified borders with one or more digitized values. The identified borders may be replaced with digitized value(s) surrounding the borders. Portions of a border may be replaced with digitized value(s) of the rock classification map closest to the portions. For example, referring to FIG. 3, the words 310 may be replaced with digitized value of the section 302. The border 312 between the sections 302, 304 may be replaced with digitized values of the sections 302, 304. For instance, half of the border 312 closest to the section 302 may be replaced with digitized value of the section 302 while half of the border 312 closest to the section 304 may be replaced with digitized value of the section 304.

In some implementations, void treatment may include filling of one or more voids in the rock classification map using one or more digitized values. A void may refer to a portion in the rock classification map without classification. For example, a void may refer to a portion in the rock classification map without pixel values corresponding to classification of rock (e.g., white space). A void may be present within the obtained rock classification map and/or created based on processing of the rock classification map. For example, referring to FIG. 3, a void may include the void 306. As another example, voids in the rock classification map 300 may be created based on removal of the lines 308, the words 310, and/or the border 312 (as part of border treatment).

Void treatment may identify voids in the rock classification map and replace the identified voids with one or more digitized values. The identified voids may be replaced with digitized value(s) surrounding the voids. Portions of a void may be replaced with digitized value(s) of the rock classification map closest to the portions. For example, referring to FIG. 3, the void 306 may be replaced with digitized values of the sections 302, 304. For instance, half of the void 306 closest to the section 302 may be replaced with digitized value of the section 302 while half of the void 306 closest to the section 304 may be replaced with digitized value of the section 304.

In some implementations, reading and writing in standard ASCII gridding format may include loading one or more files using the standard ASCII gridding format and saving one or more files using the standard ASCII gridding format. Standard ASCII gridding format may specify the structure of file. For example, standard ASCII gridding format may specify where and/or how a gridded index map is generated. For instance, standard ASCII gridding format may specify where and how column number, row number, geo-referencing coordinates (e.g., geo-locations for corners of the rock classification map), cell size, and/or digitized values of the gridded index map is to be placed within a file. A file may be loaded using the standard ASCII gridding format to generate the gridded index map, and the values corresponding to the rock classification map (e.g., column number, row number, geo-referencing coordinates, cell size, digitized values) may be saved in the file. The standard ASCII gridding format may be used/accepted by a modeling tool (e.g., common basin modeling software).

Figure 4:
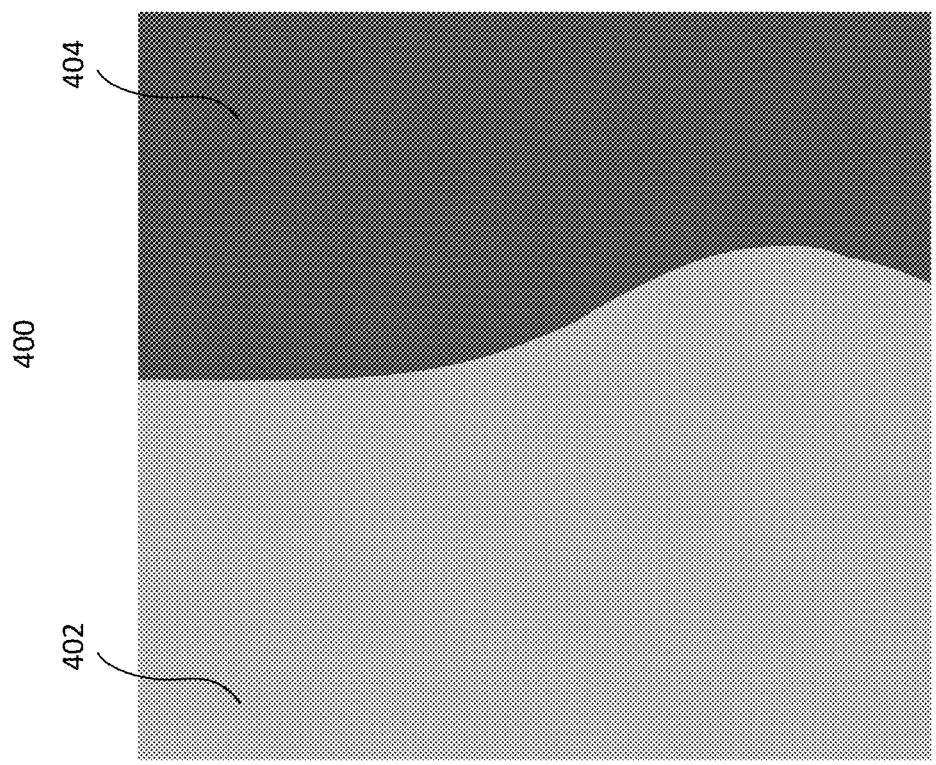
FIG. 4 illustrates an example result of image treatment applied to the rock classification map of FIG. 3.

FIG. 4 illustrates an example result of image treatment applied to the rock classification map 300 of FIG. 3. The result may include a map 400. The map 400 may be generated by removing data not used by modeling tool from the rock classification map 300. For example, the map 400 may be generated by removing annotations (e.g., the lines 308, the words 310) from the rock classification map 300, removing color gradient from the section 302, removing the border between the sections 302, 304, and removing the border around the rock classification map 300. The map 400 may be generated by filling in data in the rock classification map 300. For example, the map 400 may be generated by filling voids (e.g., the void 306) in the rock classification map 300.

For a rock classification map stored as a polygon (e.g., index polygon), a gridded index map may be generated from the rock classification map based on gridding of the polygon. Gridding the polygon may include dividing the polygon into cells using a grid. The polygon may be directly gridded to generate the gridded index map. In some implementations, the gridded index map may be generated from the rock classification map further based on image treatment of the gridded polygon. Image treatment may be applied to the gridded polygon as needed to remove data (e.g., noise, such as annotations and/or color gradients) from the gridded polygon and/or to add data (e.g., filling voids) to the gridded polygon.

The library component 106 may be configured to associate the gridded index map with lithology values. Lithology values may refer to values corresponding to physical features and/or characteristics of rocks. Lithology values may refer to values used by modeling tool to represent physical features and/or characteristics of rocks. Association of the gridded index map with lithology values may enable the model tool to generate lithologic representation of the region using the lithology values of the gridded index map. The gridded index map may be associated with the lithology values based the digitized values of the gridded index map and/or other information. Different locations/cells within the gridded index map may be associated with lithology values based on the digitized values at the corresponding locations/cells.

The gridded index map may be associated with the lithology values based on matching between the digitized values of the gridded index map and values of a rock-lithology library, and/or other information. A rock-lithology library may refer to a database and/or a matrix that establishes correspondence between digitized values and lithology values. A rock-lithology library may match a particular digitized value to a particular lithology value. A rock-lithology library may match a particular digitized value to other values relating to lithology (e.g., lithology identifier).

Use of the rock-lithology library may enable conversion of various physical features and/or characteristics of rocks provided by the rock classification map into lithology values that are used as input for modeling. The rock-lithology library may be used to convert the classification provided by the rock classification map into lithology values when no fixed relationship exists between the supplied classifications and the lithology values used as modeling input. In some implementations, the associated lithology values of the gridded index map may be stored in a table, a spreadsheet, a database, and/or other forms of structured storage.

In some implementations, different rock-lithology libraries may be used for different types of rock classification maps. For example, for a rock classification map including a sedimentary facies map, a sedimentary-lithology library may be used. The sedimentary-lithology library may match digitized values for facies interpretation with lithology values. Examples of other rock-lithology libraries include kerogen-lithology library (matching digitized values for source-kerogen with lithology values) for source-kerogen map, kinetics-lithology library (matching digitized values for rock kinetics with lithology values) for kinetics map, mineralogy-lithology library (matching digitized values for mineralogy with lithology values) for thin-section mineralogy map, and point counting-lithology library (matching digitized values for rock composition with lithology values) for point counting map. Other types of rock-lithology libraries are contemplated.

The representation component 108 may be configured to generate a lithologic representation of the region. A lithology representation of the region may refer to a computer-generated representation (e.g., 3D model) of the region that shows the lithology of different locations within the region. The lithology within the region may be represented within the model using one or more visual features (e.g., color, intensity, pattern). A lithologic representation of the region may be generated based on the lithology values of the gridded index map, and/or other information. The lithology values of the gridded index map may be input into a modeling tool to generate a lithologic representation of the region. A lithologic representation of the region may provide a lithologic snapshot of the region at a particular moment in time. Changes in the region may be simulated using one or more lithology representations of the region. For example, the region may include a basin, and one or more lithologic representations of the basin may be used for basin modeling (e.g., to simulate changes in the basin through time).

Figure 5:
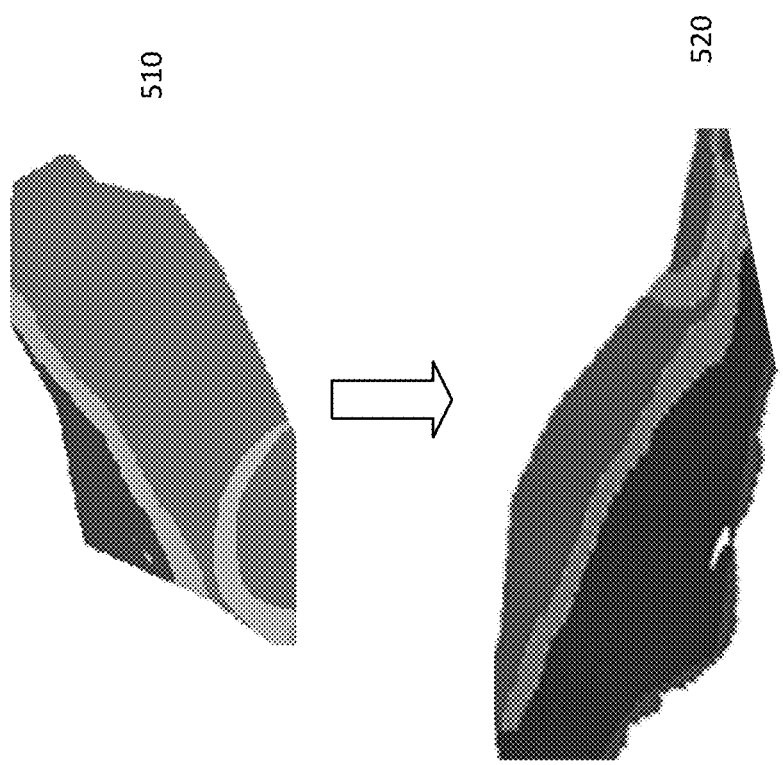
FIG. 5 illustrates an example generation of a lithologic representation of a region

FIG. 5 illustrates an example generation of a lithologic representation of a region. In FIG. 5, a rock classification map 510 for a region may have been processed using image treatment to convert pixel values of the rock classification map into digitized values. The lithology values for different locations within the region may be determined using a rock-lithology library, and the lithology values for different locations within the region may be input into a modeling tool to generate a lithologic representation 520 of the region. The lithologic representation 520 may include a three-dimensional model of the region, with the lithologies defined based on the rock classification map 510.

Figure 6:
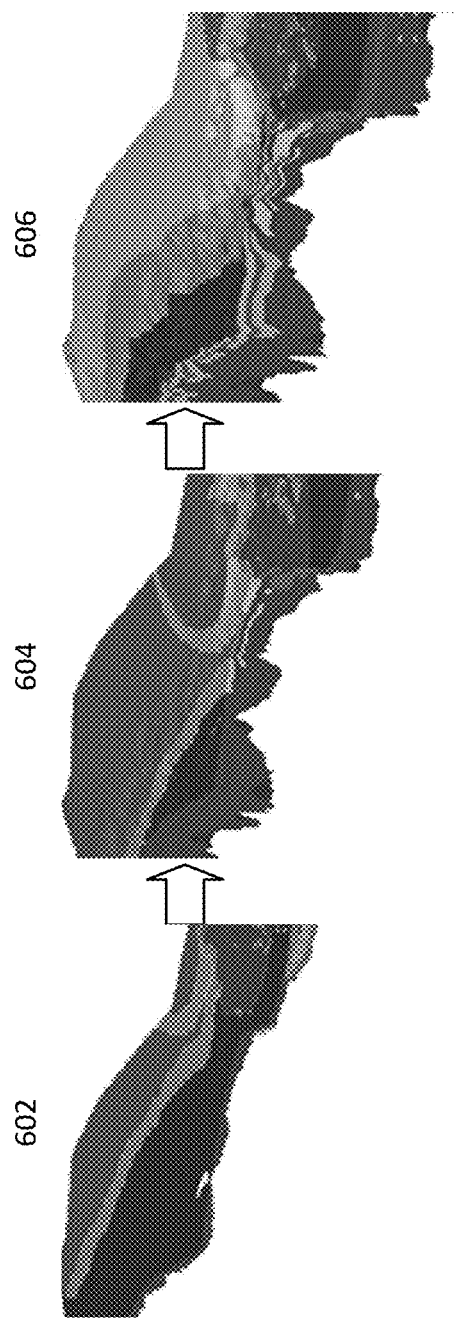
FIG. 6 illustrates example simulation of changes in a region through time.

FIG. 6 illustrates example simulation of changes in a region through time. Rock classification maps for a region may be obtained, with different rock classification map providing non-interpolatable classification of rocks in the region at different time periods. The lithology values of the region may be determined by generating gridded index maps from the rock classification maps and using a rock-lithology library. The lithology values of the region at different times may be used to model changes in the region through time. For example, in FIG. 6, lithologic representations 602, 604, 606 may show lithology within the region at three different time periods, and may show evolution of the region through time.

Figure 7:
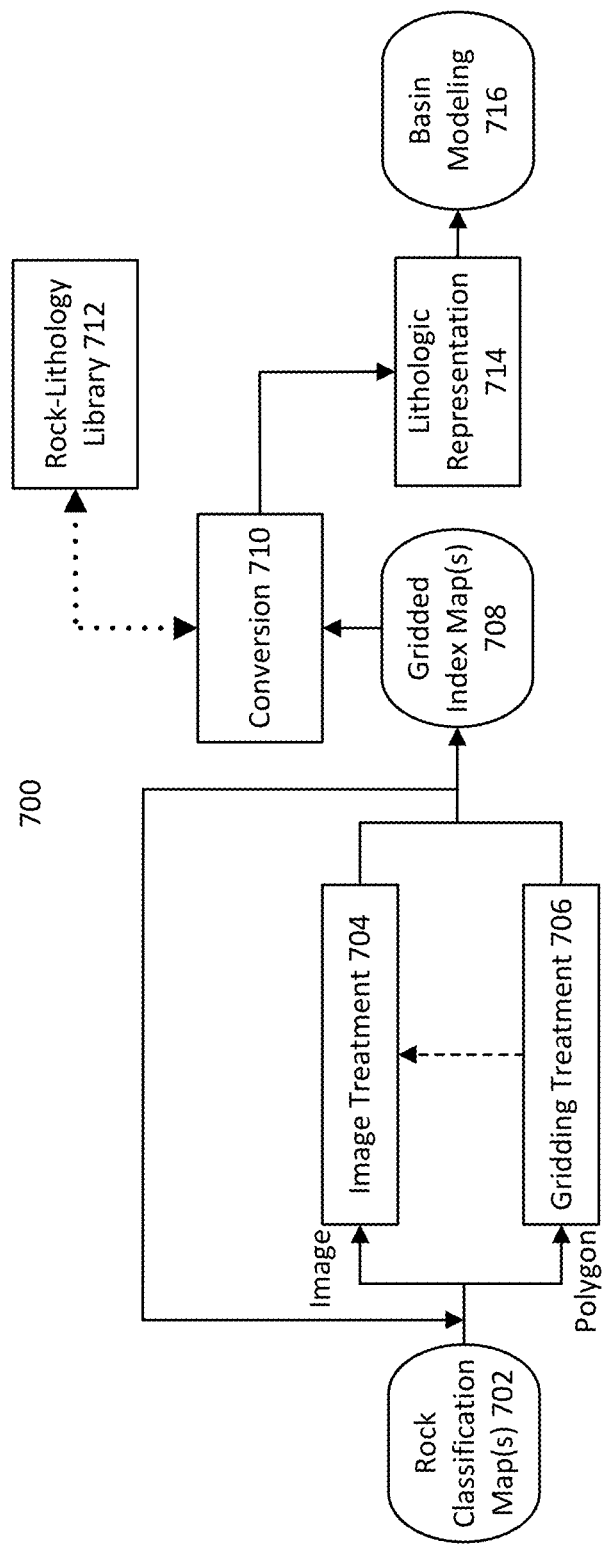
FIG. 7 illustrates an example workflow to convert rock classification maps for modeling.

FIG. 7 illustrates an example workflow 700 to convert rock classification maps for modeling. The workflow 700 may being with obtaining one or more rock classification maps 702 for a region. Gridded index map(s) 708 may be generated from the rock classification maps. A gridded index map may be generated from a rock classification map stored as an image by performing image treatment 704. A gridded index map may be generated from a rock classification map stored as a polygon by performing gridding treatment 706. In some implementations, image treatment 704 may be performed on the rock classification map stored as a polygon. Image treatment 704 and/or gridding treatment 706 may be performed for each rock classification map. Conversion 710 may be performed for digitized values of the gridded index map(s) 708. The digitized values of the gridded index map(s) 708 may be converted to lithology values for modeling using a rock-lithology library 712. The gridded index map(s) with lithology values (from the conversion 710) may be used as input to a modeling tool to generate a lithologic representation 714 (e.g., 3D model) of the region. The lithologic representation 714 may be used for basin modeling 716.

Figure 8:
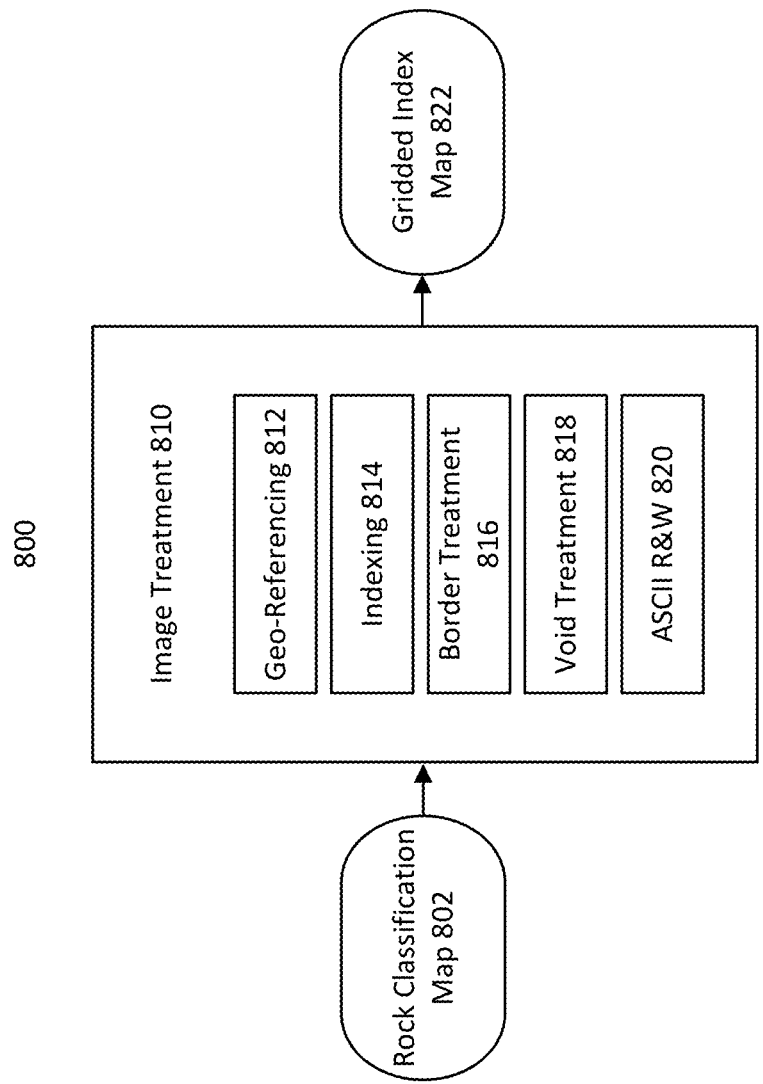
FIG. 8 illustrates an example workflow for image treatment.

FIG. 8 illustrates an example workflow 800 for image treatment. The workflow 800 may begin with obtaining a rock classification map 802 for a region. The rock classification map 802 may be processed using an image treatment 810. The image treatment 810 may include geo-referencing 812, indexing 814, border treatment 816, void treatment 818, and ASCII reading and writing 820. Geo-referencing 812 may include specifying geo-location of one or more points in the rock classification map 802. Geo-referencing 812 may include fitting the rock classification map 802 onto a three-dimensional subsurface representation of the region. Indexing 814 may include conversion of classification of rocks provided by the rock classification map 802 into digitized values. Border treatment 816 may include identification and removal of borders from the rock classification map 8002. Void treatment 818 may include identification and filling of voids in the rock classification map 802. ASCII reading and writing 820 may include reading and writing in standard ASCII gridding format. The result of the image treatment 810 may include a gridded index map 822. The gridded index map may be used as input to a modeling tool to generate lithologic representation of the region.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
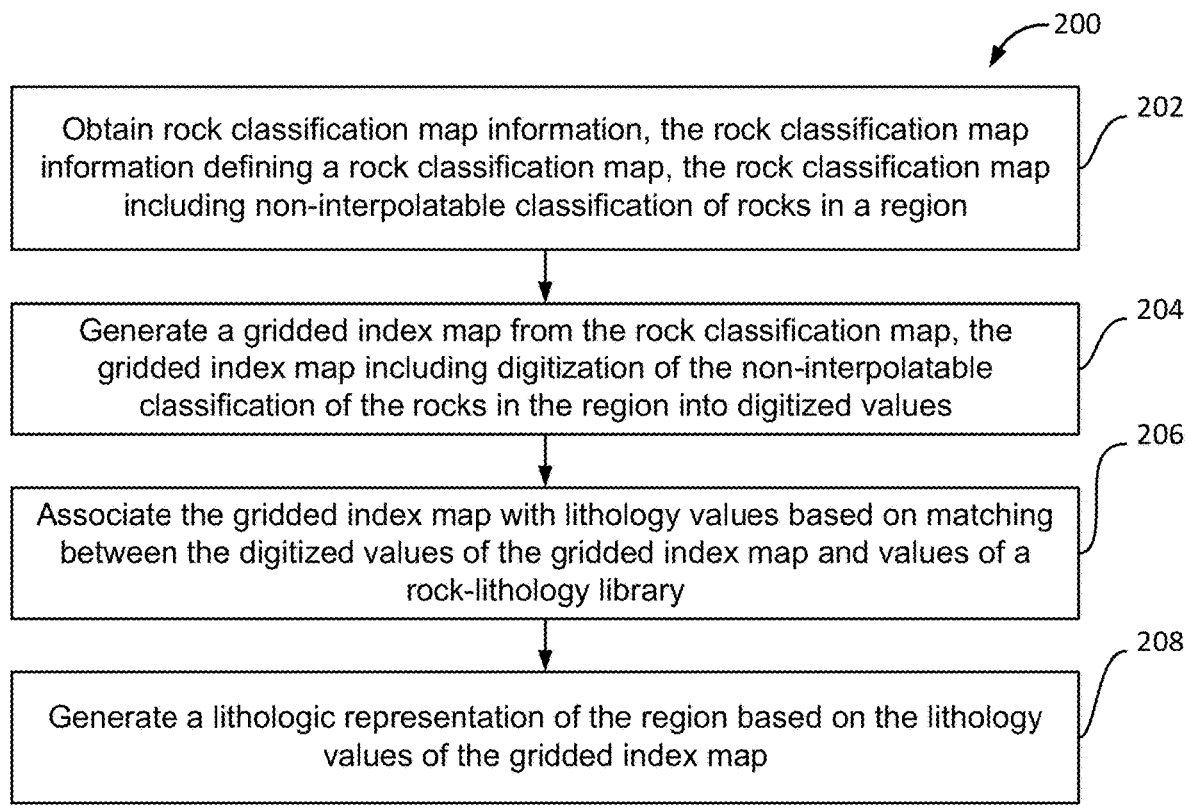
FIG. 2 illustrates an example method for converting rock classification maps for modeling.

FIG. 2 illustrates method 200 for converting rock classification maps for modeling. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, rock classification map information and/or other information may be obtained. The rock classification map information defining a rock classification map. The rock classification map may include non-interpolatable classification of rocks in a region. In some implementation, operation 202 may be performed by a processor component the same as or similar to the map component 102 (Shown in FIG. 1 and described herein).

At operation 204, a gridded index map may be generated from the rock classification map. The gridded index map may include digitization of the non-interpolatable classification of the rocks in the region into digitized values. In some implementation, operation 204 may be performed by a processor component the same as or similar to the gridded index map component 104 (Shown in FIG. 1 and described herein).

At operation 206, the gridded index map may be associated with lithology values based on matching between the digitized values of the gridded index map and values of a rock-lithology library, and/or other information. In some implementation, operation 206 may be performed by a processor component the same as or similar to the library component 106 (Shown in FIG. 1 and described herein).

At operation 208, a lithologic representation of the region may be generated based on the lithology values of the gridded index map and/or other information. In some implementation, operation 208 may be performed by a processor component the same as or similar to the representation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for converting rock classification maps for modeling, the system comprising:
   one or more physical processors configured by machine-readable instructions to:
      obtain rock classification map information, the rock classification map information defining a rock classification map stored as a raster image, the rock classification map including non-interpolatable classification of rocks in a region, wherein different non-interpolatable classifications of rocks in the region are provided by different pixel values of the rock classification map, the pixel values of the rock classification map providing the non-interpolatable classification of rocks in the region includes the different pixel values being discontinuous and interpolation of two different pixel values providing incorrect classification of rocks in the region;
      generate a gridded index map from the rock classification map, the gridded index map including a grid of cells that represents the region, the cells including digitized values of the non-interpolatable classification of the rocks in the region;
      associate the gridded index map with lithology values based on matching between the digitized values of the gridded index map and values of a rock-lithology library, the rock-lithology library establishing correspondence between different digitized values and different lithology values, wherein the rock-lithology library establishes correspondence between a first digitized value and a first lithology value, and a first cell of the gridded index map including the first digitized value is associated with the first lithology value based on the correspondence between the first digitized value and the first lithology value established by the rock-lithology library; and
      generate a lithologic representation of the region based on the lithology values of the gridded index map.

2. The system of claim 1, wherein the gridded index map is generated from the rock classification map based on image treatment of the raster image.

3. The system of claim 2, wherein the image treatment of the raster image includes geo-referencing, indexing, border treatment, void treatment, and reading and writing in standard ASCII gridding format.

4. The system of claim 3, wherein the geo-referencing includes fitting the gridded index map onto a three-dimensional subsurface representation of the region, wherein fitting the gridded index map onto the three-dimensional subsurface representation of the region includes specifying geo-location of a starting point and an ending point of the gridded index map.

5. The system of claim 3, wherein the indexing includes conversion of the pixel values of the rock classification map into the digitized values.

6. The system of claim 5, wherein the digitized values of the non-interpolatable classification of the rocks in the region included in the cells of the gridded index map are determined based on:
  determination of one or more dominant faces in the rock classification map;
  replacement of one or more of the pixel values of the rock classification map that do not correspond to the one or more dominant faces in the rock classification map with one or more of the pixel values of the dominant faces in the rock classification map.

7. The system of claim 3, wherein:
  the border treatment includes (1) identification of a border in the rock classification map; the border including a line that separate adjacent portions of the rock classification map with different pixel values to indicate different classifications of the rocks in the adjacent portions, and (2) replacement of the border with two of the digitized values surrounding the border; and
  the void treatment includes (1) identification of a void in the rock classification map, the void including a portion of the rock classification map without pixel values corresponding to the non-interpolatable classification of rocks, and (2) replacement of the void with one or more of the digitized values closest to the void.

8. The system of claim 1, wherein the region includes a basin, and the lithologic representation of the basin is used for basin modeling.

9. The system of claim 8, wherein:
  the rock classification map information defines multiple rock classification maps, different ones of the rock classification maps including non-interpolatable classification of rocks in the region at different time periods; and
  the basin modeling includes generation of multiple lithologic representations of the basin from the multiple rock classification maps to show evolution of lithologic changes in the basin at the different time periods.

10. The system of claim 1, wherein:
  the rock classification map information defines multiple rock classification maps, different ones of the rock classification maps including non-interpolatable classification of rocks in different depth portions of the region; and
  the lithologic representation of the region includes the different depth portions of the region generated from the multiple rock classification maps.

11. A method for converting rock classification maps for modeling, the method comprising:
  obtaining rock classification map information, the rock classification map information defining a rock classification map stored as a raster image, the rock classification map including non-interpolatable classification of rocks in a region, wherein different non-interpolatable classifications of rocks in the region are provided by different pixel values of the rock classification map, the pixel values of the rock classification map providing the non-interpolatable classification of rocks in the region includes the different pixel values being discontinuous and interpolation of two different pixel values providing incorrect classification of rocks in the region;
  generating a gridded index map from the rock classification map, the gridded index map including a grid of cells that represents the region, the cells including digitized values of the non-interpolatable classification of the rocks in the region;
  associating the gridded index map with lithology values based on matching between the digitized values of the gridded index map and values of a rock-lithology library, the rock-lithology library establishing correspondence between different digitized values and different lithology values, wherein the rock-lithology library establishes correspondence between a first digitized value and a first lithology value, and a first cell of the gridded index map including the first digitized value is associated with the first lithology value based on the correspondence between the first digitized value and the first lithology value established by the rock-lithology library; and
  generating a lithologic representation of the region based on the lithology values of the gridded index map.

12. The method of claim 11, wherein the gridded index map is generated from the rock classification map based on image treatment of the raster image.

13. The method of claim 12, wherein the image treatment of the raster image includes geo-referencing, indexing, border treatment, void treatment, and reading and writing in standard ASCII gridding format.

14. The method of claim 13, wherein the geo-referencing includes fitting the gridded index map onto a three-dimensional subsurface representation of the region, wherein fitting the gridded index map onto the three-dimensional subsurface representation of the region includes specifying geo-location of a starting point and an ending point of the gridded index map.

15. The method of claim 13, wherein the indexing includes conversion of the pixel values of the rock classification map into the digitized values.

16. The method of claim 15, wherein the digitized values of the non-interpolatable classification of the rocks in the region included in the cells of the gridded index map are determined based on:
  determination of one or more dominant faces in the rock classification map;
  replacement of one or more of the pixel values of the rock classification map that do not correspond to the one or more dominant faces in the rock classification map with one or more of the pixel values of the dominant faces in the rock classification map.

17. The method of claim 13, wherein:
  the border treatment includes (1) identification of a border in the rock classification map; the border including a line that separate adjacent portions of the rock classification map with different pixel values to indicate different classifications of the rocks in the adjacent portions, and (2) replacement of the border with two of the digitized values surrounding the border; and
  the void treatment includes (1) identification of a void in the rock classification map, the void including a portion of the rock classification map without pixel values corresponding to the non-interpolatable classification of rocks, and (2) replacement of the void with one or more of the digitized values closest to the void.

18. The method of claim 11, wherein the region includes a basin, and the lithologic representation of the basin is used for basin modeling.

19. The method of claim 18, wherein:
the rock classification map information defines multiple rock classification maps, different ones of the rock classification maps including non-interpolatable classification of rocks in the region at different time periods; and
the basin modeling includes generation of multiple lithologic representations of the basin from the multiple rock classification maps to show evolution of lithologic changes in the basin at the different time periods.

20. The method of claim 11, wherein:
the rock classification map information defines multiple rock classification maps, different ones of the rock classification maps including non-interpolatable classification of rocks in different depth portions of the region; and
the lithologic representation of the region includes the different depth portions of the region generated from the multiple rock classification maps.

* * * * *